United States Patent
Polewarczyk et al.

(10) Patent No.: US 8,961,724 B2
(45) Date of Patent: Feb. 24, 2015

(54) STRUCTURAL COMPOSITE PANEL WITH METALLIC FOAM CORE

(71) Applicant: GM Global Technology Operations LLC, Detroit, MI (US)

(72) Inventors: Joseph M. Polewarczyk, Rochester Hills, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 13/737,299

(22) Filed: Jan. 9, 2013

(65) Prior Publication Data
US 2014/0193608 A1 Jul. 10, 2014

(51) Int. Cl.
*B32B 5/18* (2006.01)
*B32B 38/00* (2006.01)
*B29D 99/00* (2010.01)
*B32B 37/18* (2006.01)
*B32B 38/10* (2006.01)

(52) U.S. Cl.
CPC .............. *B32B 5/18* (2013.01); *B32B 38/0012* (2013.01); *B29D 99/001* (2013.01); *B32B 37/185* (2013.01); *B32B 38/10* (2013.01); *B32B 2305/022* (2013.01); *B32B 2305/076* (2013.01); *B32B 2311/00* (2013.01); *B32B 2607/00* (2013.01)

USPC ........... 156/219; 156/256; 156/285; 156/286; 156/307.1

(58) Field of Classification Search
CPC .... B29C 63/0021; B29C 70/543; B32B 5/18; B32B 5/22; B32B 15/08; B32B 27/04; B32B 37/185; B32B 38/0012
USPC ....................... 156/219, 256, 285, 286, 307.1
See application file for complete search history.

(56) References Cited

U.S. PATENT DOCUMENTS

| | | | | |
|---|---|---|---|---|
| 4,791,765 A | * | 12/1988 | Noggle | 52/309.2 |
| 7,819,452 B2 | * | 10/2010 | Fuchs et al. | 156/60 |
| 2008/0286099 A1 | * | 11/2008 | Rao et al. | 415/213.1 |
| 2011/0036149 A1 | * | 2/2011 | Bach et al. | 73/40.7 |
| 2012/0163982 A1 | * | 6/2012 | Rice | 156/176 |

OTHER PUBLICATIONS

Metal Foam, Wikipedia, retrieved Nov. 27, 2011.*

* cited by examiner

*Primary Examiner* — Philip Tucker
*Assistant Examiner* — John Blades
(74) *Attorney, Agent, or Firm* — Quinn Law Group, PLLC

(57) ABSTRACT

A structural panel includes a closed-cell foam core formed of a metallic material; a first carbon-fiber panel bonded to a first side of the closed-cell foam core; and a second carbon-fiber panel bonded to a second side of the closed-cell foam core such that the foam core is disposed between the first carbon-fiber panel and the second carbon-fiber panel.

5 Claims, 1 Drawing Sheet

STRUCTURAL COMPOSITE PANEL WITH METALLIC FOAM CORE

TECHNICAL FIELD

The present invention relates generally to composite part forming techniques.

BACKGROUND

Composite materials are typically formed by suspending a high-tensile strength fibrous material within a solidified epoxy/resin matrix. Carbon-fiber composite is an example of one composite material that is used in manufacturing applications. It is favored for its high strength and light weight properties. Most carbon-fiber composite panels in common use are relatively thin, and thus require a secondary-frame or structure to protect against bending modes. This secondary frame, however, can add both complexity and weight to the finished part, which is counter to the original weight-saving purpose of the carbon-fiber.

SUMMARY

A structural panel includes a closed-cell foam core formed of a metallic material; a first carbon-fiber panel bonded to a first side of the closed-cell foam core; and a second carbon-fiber panel bonded to a second side of the closed-cell foam core such that the foam core is disposed between the first carbon-fiber panel and the second carbon-fiber panel.

The foam core may include a perimeter structure and a stiffening rib, and may define a plurality of weight-reducing voids between the perimeter structure and the stiffening rib. The perimeter structure of the foam core may be configured to align with, yet be interior to the perimeter of each of the first carbon-fiber panel and the second carbon-fiber panel.

During the process, heat may be applied to each of the respective first and second carbon-fiber panels. Likewise, pressure may also be applied such that each of the respective first and second carbon-fiber panels are deformed into each of the plurality of machined voids. This process may occur, for example, through vacuum forming.

In one configuration, the closed-cell foam core may be made from aluminum, and may have a porous cellular structure. The average size of each pore of the porous cellular structure may be between approximately 1 mm and approximately 8 mm.

Likewise, a method of making a structural composite may include positioning a closed-cell foam core between a first carbon-fiber panel and a second carbon-fiber panel; and bonding each of the respective first carbon-fiber panel and second carbon-fiber panel to the closed-cell foam core.

Each of the respective first and second carbon-fiber panels may be pre-impregnated panels that include a partially cured resin disposed about a fiber sheet. During the final molding process, as heat is applied to form the panels to the foam core, the heat may also be operative to fully cure the partially cured resin.

The above features and advantages and other features and advantages of the present invention are readily apparent from the following detailed description of the best modes for carrying out the invention when taken in connection with the accompanying drawings.

DETAILED DESCRIPTION

Figure 1:
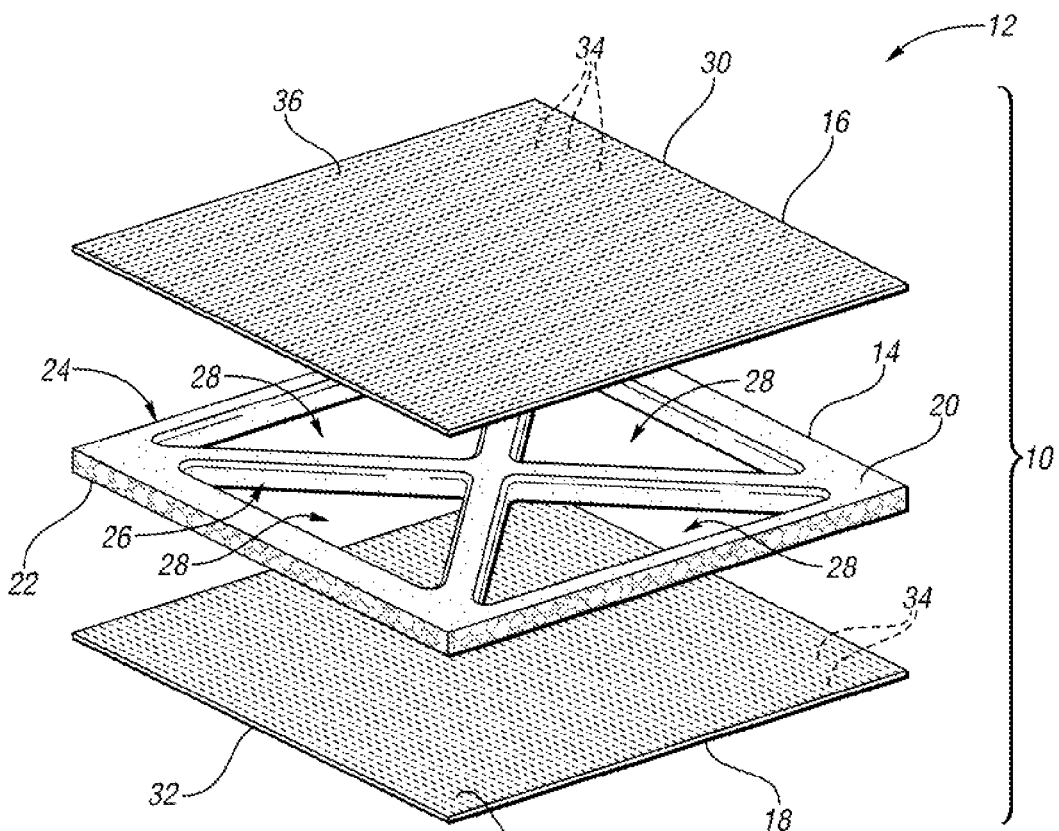
FIG. 1 is a schematic exploded view of a structural composite panel having a foam core.

Referring to the drawings, wherein like reference numerals are used to identify like or identical components in the various views, FIG. 1 schematically illustrates an exploded perspective view 10 of a structural composite panel 12. The panel 12 includes a foam core 14, a first fiber-reinforced composite panel 16 and a second fiber-reinforced composite panel 18.

The foam core 14 may be a closed-cell, solidified foam/cellular structure that may be made from a metallic material. For example, the foam core may be made from an aluminum material that defines a multitude of internal, gas-filled pores. The average size of each pore within the porous cellular structure may range from between approximately 1 mm to approximately 8 mm in diameter (noting that the pores may not be perfectly spherical in shape). The foam core 14 may be disposed between the first fiber-reinforced composite panel 16 and a second fiber-reinforced composite panel 18 such that the first fiber-reinforced composite panel 16 is on a first side 20 of the foam core 14, and the second fiber-reinforced composite panel 18 is on a second side 22 of the foam core 14, which opposes the first side 20.

In one configuration, the foam core 14 may generally include a perimeter structural portion 24 and at least one stiffening rib 26. Between the perimeter portion 24 and the stiffening rib, the foam core 14 may define a plurality of weight-reducing voids 28. The foam core 14 may initially be formed as a single continuous panel. Based on the final panel shape and intended use, non-load-bearing portions of the panel may be removed using machining processes such as milling. In this manner, once fully assembled, the foam core 14 may serve to stiffen the structural composite panel 12 against bending while adding as little additional weight as possible. When assembled, the perimeter structural portion 24 of the foam core 14 may align with, and be interior to the perimeters 30, 32 of the each of the respective first and second composite panels 16, 18.

Each of the first and second fiber-reinforced composite panels 16, 18 may include a plurality of uni- or multi-directional fibers 34 disposed within an epoxy or resinous matrix/substrate 36. In one configuration, the fibers 34 may include spun glass fibers, carbon fibers, graphite fibers or other suitable high-tensile strength fiber materials. In one configuration, each individual fiber may have a thickness/diameter of approximately 5-10 μm. In other configurations, however, fibers having larger or smaller thicknesses may likewise be used.

Prior to final assembly, each of the first and second fiber-reinforced composite panels 16, 18 may be in the form of pre-impregnated ("pre-preg") blanks. In very general terms, a pre-preg blank may be a generally formed part that may be used in subsequent molding processes to form a part with more complex geometry. Typically, multiple pre-preg blanks are molded together to form a complex geometry, with a final curing process ultimately fusing the pre-pregs together into a single, solid part. The resinous matrix/substrate 36 in the pre-preg panels 16, 18 may be partially cured or pre-cured such that the fibers 34 are suspended within the substrate 36 and the substrate 36 is solidified to a point where it may be handled. The pre-curing process may involve, for example, heating the resin/epoxy to a temperature lower than a final curing temperature, though above ambient. For example, with a resin that may be finally cured at 300 degrees Celsius, the pre-curing may take place by heating the resin to 100 degrees Celsius, and potentially for a shorter duration of time.

During a final forming/molding process, each of the first and second fiber-reinforced composite panels 16, 18 may be drawn and/or deformed into each of the plurality of weight-reducing voids 28 through the application of temperature and/or pressure. For example, in one configuration, the air within the voids 28 may be evacuated, such as through a process of vacuum forming, to draw the first and second composite panels 16, 18 into the voids 28. In another configuration, a positive pressure, such as through physical contact from a die or mold, may be applied to an exterior surface of each panel 16, 18 to inwardly deform the panels into the voids 28.

Figure 2:
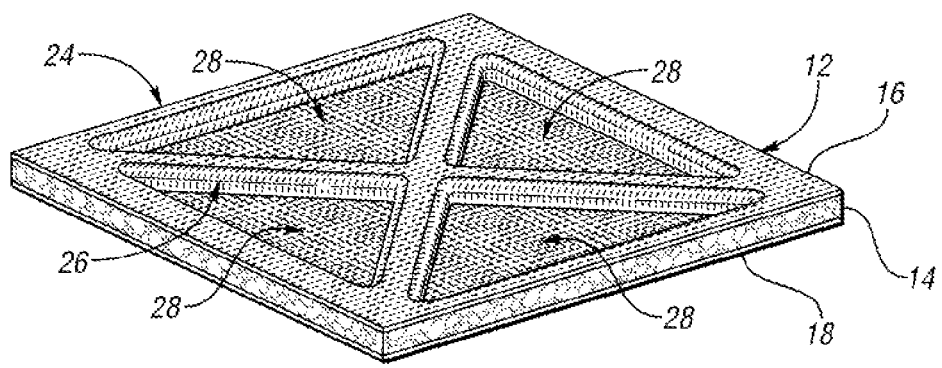
FIG. 2 is a schematic perspective view of an assembled structural composite panel such as shown in FIG. 1.

Once the structural composite panel 12 is finally formed/molded into its final shape, as generally shown in FIG. 2, the panel 12 may be heated to a curing temperature for a predetermined length of time. In this manner, the resin/substrate portion 36 of each of the first and second fiber-reinforced composite panels 16, 18 may harden and set in the molded shape. In some configurations, during the forming process, each of the first and second fiber-reinforced composite panels 16, 18 may be drawn and/or deformed into one or more of the voids 28 to a degree where the first fiber-reinforced composite panel 16 may contact the second fiber-reinforced composite panel 18 within the respective void 28. When the panels are cured through the application of heat, the resin/substrate portion 36 of the first fiber-reinforced composite panel 16 may bond with the resin/substrate portion 36 of the second fiber-reinforced composite panel 18. In this manner, the first and second fiber-reinforced composite panels 16, 18 may form an integral structure, with the metallic foam core 14 being sandwiched in-between.

Figure 3:
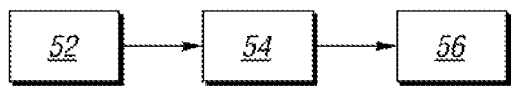
FIG. 3 is a flow diagram illustrating a method of making a structural composite.

FIG. 3 schematically illustrates a method 50 of forming a structural composite panel 12 in the manner described above. As shown, the method 50 begins by forming a plurality of voids in a metallic closed-cell foam core (step 52). In one configuration, these voids may be formed through a machining process, such as milling. The formed foam core generally includes a perimeter structure and at least one stiffening rib, with the plurality of voids defined between the perimeter structure and the stiffening rib.

In step 54, the closed-cell foam core is positioned between a first carbon-fiber panel and a second carbon-fiber panel. In step 56, each of the respective first carbon-fiber panel and second carbon-fiber panel are bonded to the closed-cell foam core through a curing process. The curing process may include heating each of the respective first and second carbon-fiber panels; and applying pressure to each of the respective first and second carbon-fiber panels such that each of the respective first and second carbon-fiber panels are deformed into each of the plurality of machined voids. In one configuration, each of the respective first and second carbon-fiber panels are pre-impregnated panels including a partially cured resin disposed about a fiber sheet. As such, heating each of the respective first and second carbon-fiber panels is operative to fully cure/harden the partially cured resin and bond it to each of the foam core.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of forming a structural composite panel comprising:
   machining a plurality of voids in a closed-cell foam core;
   wherein the machined foam core includes a perimeter structure and a stiffening rib;
   wherein the plurality of voids are defined between the perimeter structure and the stiffening rib;
   positioning the closed-cell foam core between a first carbon-fiber panel and a second carbon-fiber panel, the closed-cell foam core being formed from a metallic material;
   bonding each of the respective first carbon-fiber panel and second carbon-fiber panel to the closed-cell foam core, wherein the bonding includes:
      heating each of the respective first and second carbon-fiber panels; and
      applying pressure to each of the respective first and second carbon-fiber panels such that each of the respective first and second carbon-fiber panels are deformed into each of the plurality of machined voids.

2. The method of claim 1, wherein positioning a closed-cell foam core between a first carbon-fiber panel and a second carbon-fiber panel is such that the perimeter structure of the foam core aligns with, and is interior to the perimeter of each of the first carbon-fiber panel and the second carbon-fiber panel.

3. The method of claim 1, wherein each of the respective first and second carbon-fiber panels are pre-impregnated panels including a partially cured resin disposed about a fiber sheet; and
   wherein heating each of the respective first and second carbon-fiber panels is operative to fully cure the partially cured resin.

4. The method of claim 1, wherein the closed-cell foam core is aluminum.

5. The method of claim 1, wherein the closed-cell foam core includes a porous cellular structure; and
   wherein the average size of each pore of the porous cellular structure is between approximately 1 mm and approximately 8 mm.

* * * * *